(12) United States Patent
Martin et al.

(10) Patent No.: US 8,362,861 B2
(45) Date of Patent: Jan. 29, 2013

(54) ELECTROMAGNETIC ACTUATOR

(75) Inventors: Andreas Martin, Meβkirch (DE); David Muffler, Messkirch (DE); Ingo Bauerschmidt, Shanghai (CN); Volker Knies, Mühlingen-Zoznegg (DE)

(73) Assignee: ETO Magnetic GmbH, Stockach (DE)

( * ) Notice: Subject to any disclaimer, the term of this patent is extended or adjusted under 35 U.S.C. 154(b) by 973 days.

(21) Appl. No.: 12/062,109

(22) Filed: Apr. 3, 2008

(65) Prior Publication Data

US 2008/0246568 A1 Oct. 9, 2008

(30) Foreign Application Priority Data

Apr. 4, 2007 (DE) .................... 20 2007 005 133 U

(51) Int. Cl.
*H01F 3/00* (2006.01)
(52) U.S. Cl. ........................ 335/255; 335/220
(58) Field of Classification Search .................. 335/126, 335/131–136, 220–229, 255–264; 251/129.01–129.22
See application file for complete search history.

(56) References Cited

U.S. PATENT DOCUMENTS

| | | | |
|---|---|---|---|
| 4,054,854 A | 10/1977 | Marsden | |
| 4,540,962 A * | 9/1985 | Gresley et al. | 335/131 |
| 4,604,597 A * | 8/1986 | Bogner et al. | 335/127 |
| 4,725,801 A * | 2/1988 | Snyder | 335/125 |
| 4,749,976 A * | 6/1988 | Pichler | 335/257 |
| 4,845,451 A * | 7/1989 | Uetsuhara et al. | 335/257 |
| 6,315,268 B1 | 11/2001 | Cornea et al. | |
| 2003/0184422 A1* | 10/2003 | Matsusaka et al. | 335/220 |
| 2008/0115751 A1* | 5/2008 | Knecht et al. | 123/90.17 |

FOREIGN PATENT DOCUMENTS

| | | |
|---|---|---|
| DE | 3014962 A1 | 10/1981 |
| DE | 4343879 A1 | 6/1995 |
| EP | 1073070 A | 1/2001 |
| FR | 2544910 A | 10/1984 |

OTHER PUBLICATIONS

European Search Report for EP08004375.5, dated May 28, 2008.

* cited by examiner

*Primary Examiner* — Bernard Rojas
(74) *Attorney, Agent, or Firm* — Bachman & LaPointe, P.C.

(57) ABSTRACT

Electromagnetic actuator having an armature unit which is axially guided in a housing and movable by passing current through a coil device and in particular against a return force of a return spring out of a first stop position defined by means for limiting the stroke, the means for limiting the stroke having a stop element which is mounted terminally in the housing and manufactured by a shaping, stamping, sintering and/or injection molding method, and which is designed to cooperate with a plunger unit which can be actuated outside the housing and is designed for mechanically moving the armature out of the first stop position.

16 Claims, 4 Drawing Sheets

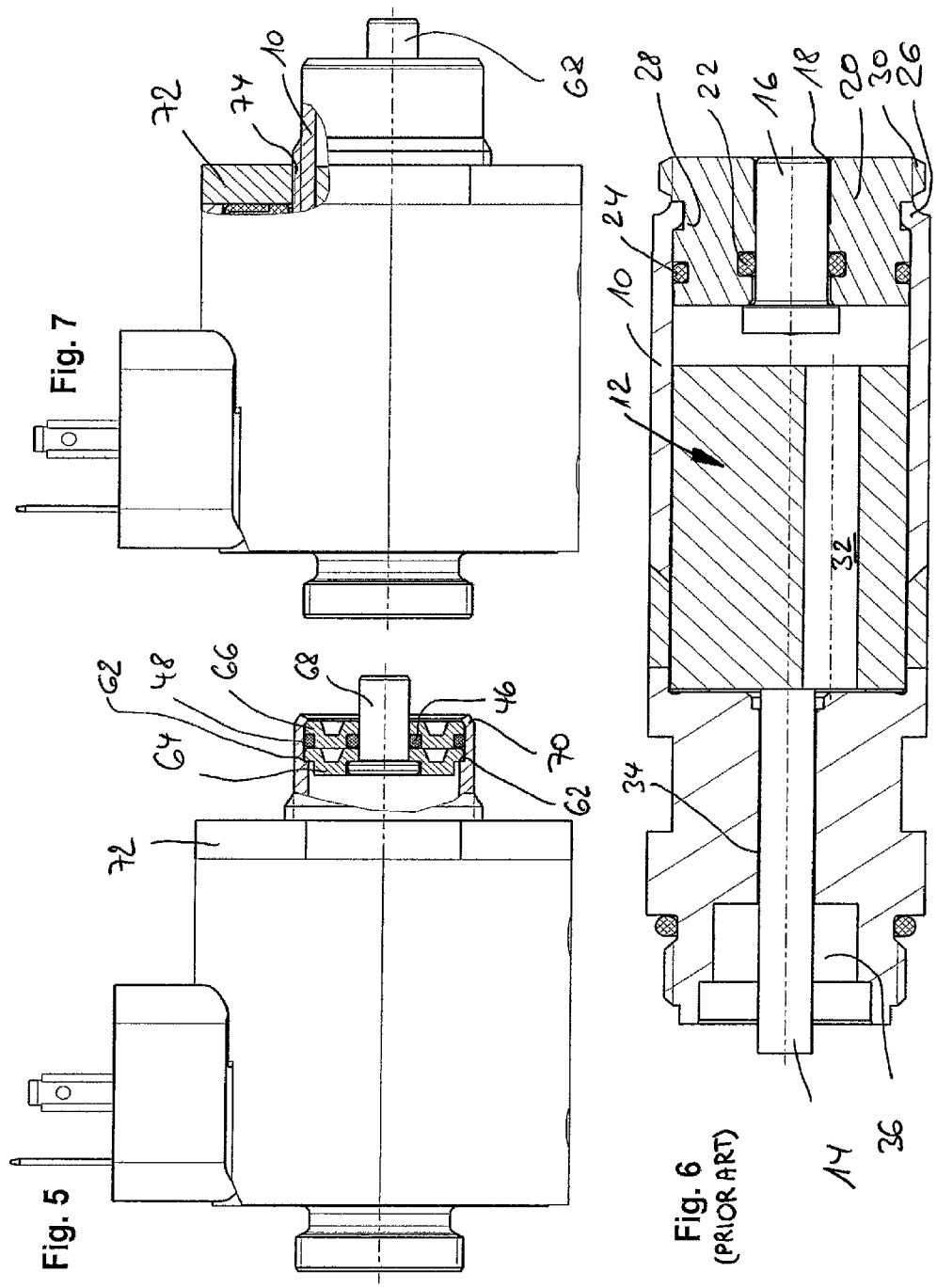

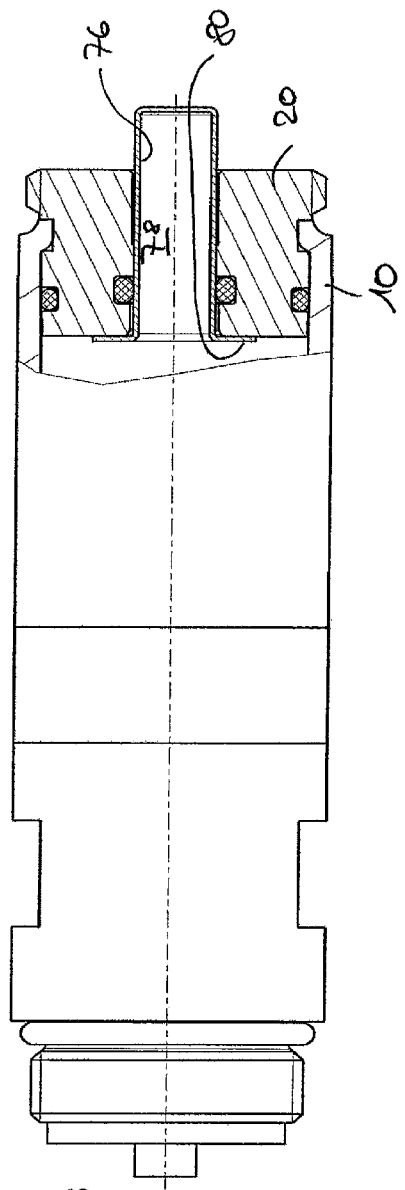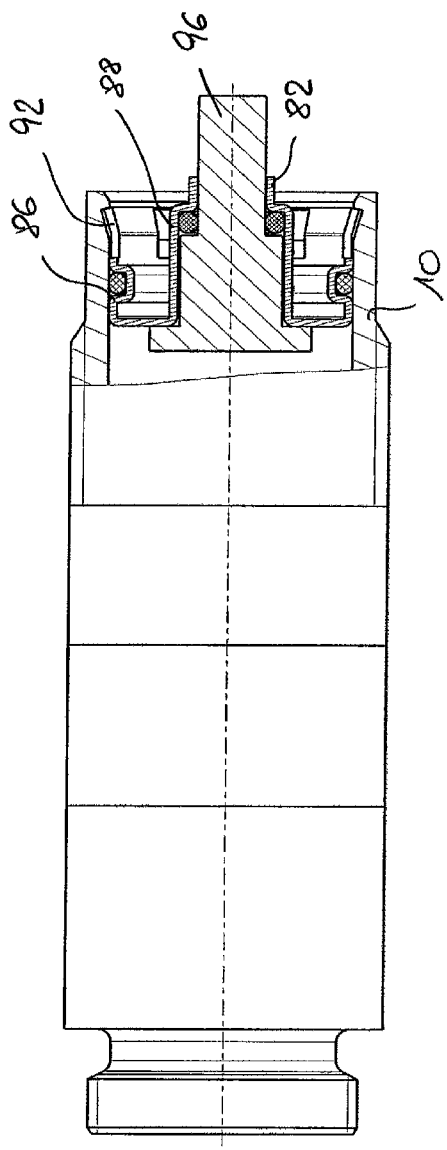

US 8,362,861 B2

ELECTROMAGNETIC ACTUATOR

BACKGROUND OF THE INVENTION

The present invention concerns an electromagnetic actuator according to the introductory part of the main claim. A device of this kind is universally known from the state of the art, FIG. 6 representing the applicant's internal state of the art but being used as generic and delimiting.

Specifically, the sectional view of FIG. 6 shows an electromagnetic actuator which is typically designed to actuate a hydraulic or pneumatic valve as an actuating partner and which has an armature unit guided in a housing 10 and consisting of an armature body 12 and an armature plunger 14 seated thereon. With its left engaging end, the armature plunger 14 actuates the actuating partner.

In a manner not shown, the arrangement (as otherwise known) is surrounded by a coil support together with coil device, and when current is passed through the coil device the armature unit 12, 14 is moved (against the force of a return spring, not shown, typically constructed on the side of the actuating partner) into the left position shown in FIG. 6. When the current through the coil device is switched off or the polarity of the control signal is reversed, the armature unit then moves back into the right stop position (referred to FIG. 6), then abutting against a plunger element 16 (so-called emergency or manual plunger for manually actuating the armature by e.g. pushing on an engaging end 18). As can be seen from FIG. 6, the emergency manual plunger (typically made as a rotatable part) is held centrally in a stop element 20 (in a sealing relationship by means of an inner ring seal 22), the stop element 22 (which is in turn sealed off from a hollow cylindrical inner wall of the housing 10 by means of an outer ring seal 24 and non-releasably attached to the housing by means of a crimped portion 26 of the end of the housing, which engages in an annular groove 28 in component 20) being constructed as a rotatable part as well. In addition the rotatable part 20 has at the end a suitably applied external thread 30 which is provided for cooperation with a sleeve nut (not shown in FIG. 6) with which then e.g. the arrangement shown can be suitably attached or fixed at a point of application.

The device shown, which is used as generic, has numerous drawbacks which prove to be unfavourable and in need of improvement particularly with a view to favourable manufacture in large series; thus first of all the design of the manual plunger 16 and of the stroke-limiting stop element 20 as rotatable parts is inherently elaborate and therefore expensive. Also the assembly shown is disadvantageous with respect to internal pressure or fluid equalisation (mainly concerning oil flowing in the assembly): as illustrated for example by the longitudinal bore 32 shown in the sectional view of FIG. 6 and running axially/eccentrically in the armature body 12 (which bore is then in flow communication with a channel 34 surrounding the solid armature plunger 14 and substantially produced by play and opening towards the outlet end 36), fluid conduction for the purpose of equalising pressure between the right end stop and the end 36 is problematic and, for example with respect to precise guiding of the armature, also in need of improvement.

SUMMARY OF THE INVENTION

It is therefore the object of the present invention to overcome the weak points shown, and in particular to improve the mechanical construction of the stop element provided terminally in the housing, in connection with the manual plunger unit, and in addition to optimise fluid (oil) equalisation in the whole system.

The present invention is achieved by the device according to the characteristics of the independent claims; advantageous developments of the invention are described in the subsidiary claims. Here, the invention is not confined to the claims, but instead all characteristics as described in connection with the state of the art selected as generic according to FIG. 6 are claimed as belonging to the invention, as well as the characteristics which follow from the discussion of FIGS. 1 to 12 below, individually or in combination in particular with the introductory part of the main claim.

Thus first of all the solution for the stop element which is manufactured according to the invention by a shaping, stamping, sintering and/or injection moulding method ensures that it can be manufactured and assembled with full automation, at low cost and with high precision, such production (by primary or other shaping) producing considerable cost advantages. Within the scope of the invention or alternatively it is also possible to design accordingly the plunger unit which can be actuated outside the housing.

While preferably the stop element is constructed in two parts, namely with a stop element preferably constructed as a plastic or the like injection moulding and a disc element directly cooperating therewith, so that suitable sealing elements can be held between them—either seated directly on them, e.g. by injection moulding or the like, or by insertion of for example ring seals, alternatively the invention also encompasses constructing the stop element as a one-piece deep-drawn part which can then further preferably be provided with suitable grooves, undercut portions, shoulders or the like for the provision of sealing sections (which are in turn seated integrally or separate).

It is also within the scope of the invention (as well as claimed as an independent invention, in particular according to the introductory part of the main claim) to construct the plunger section of the armature unit composed of armature body and plunger section as a sleeve or the like hollow element, so that not only—according to the invention—favourable manufacture is possible by deep drawing or the like, but also this component itself with the central plunger chamber can serve as a fluid-conducting channel for fluid pressure equalisation (e.g. for oil in the system shown), and according to a development additionally in a direction towards the armature body forms a (mounting) flange or collar which can economically simply and elegantly serve as a distance piece (distance section) between armature body and respective stop position in the housing. Advantageously, use of the sleeve-like plunger section for pressure equalisation also makes it possible for an associated pressure-communicating bore in the armature body to be centrally guided advantageously.

Advantageously, it is also within the scope of the invention (but also within the scope of independently claimed protection) to design the stop element, which is preferably to be constructed as a deep-drawn part, in such a way terminally in relation to the housing that the latter can there cooperate in snap-fit or latching relationship with a suitable support or undercut portion, so that in this respect beading or the like measure as known from the state of the art can be eliminated; alternatively it is provided within the scope of the invention (and claimed independently of it) that a deep-drawn stop element of this kind can be provided with a connecting section for non-releasable connection to the housing, e.g. gluing or welding.

As a result, the present invention in a surprisingly simple and elegant manner provides a way of significantly improving generic electromagnetic actuators which are advantageous, particularly from manufacturing and assembly points of view.

BRIEF DESCRIPTION OF THE DRAWINGS

Further advantages, characteristics and details of the invention are apparent from the following description of preferred embodiments and with reference to the drawings; the latter show:

FIG. 5: a part-sectional view of a third embodiment of the present invention;

FIG. 6: a sectional view to illustrate the (internal) state of the art used as generic;

FIG. 7: a part-sectional view according to a fourth embodiment, for which protection is requested in connection with all the other embodiments, but also independently;

FIG. 8: a part-sectional view of a fifth embodiment of the present invention, for which protection is requested in connection with all the other embodiments, but also independently;

FIG. 9: a part-sectional view of a sixth embodiment of the present invention, for which protection is requested in connection with all the other embodiments, but also independently;

DETAILED DESCRIPTION

The reference numbers and functionality of FIG. 6, which is described for the generic state of the art, apply analogously to the description of the practical examples below, unless described otherwise. Furthermore, an actuator body 11, containing a coil device 13 (schematically shown) may be as disclosed in U.S. Pat. No. 6,848,919 B2 or U.S. patent application Ser. No. 12/061,197, filed Apr. 2, 2008. The disclosures of U.S. Pat. No. 6,848,919 B2 and U.S. patent application Ser. No. 12/061,197 are incorporated by reference in their entireties herein as if set forth at length.

Figure 1:
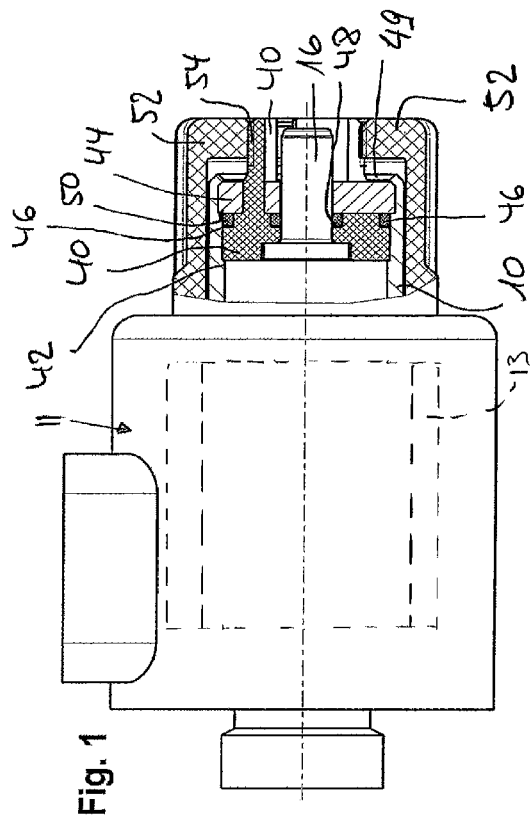
FIG. 1: a side view with partial section to illustrate a first embodiment of the present invention.
Figure 2:
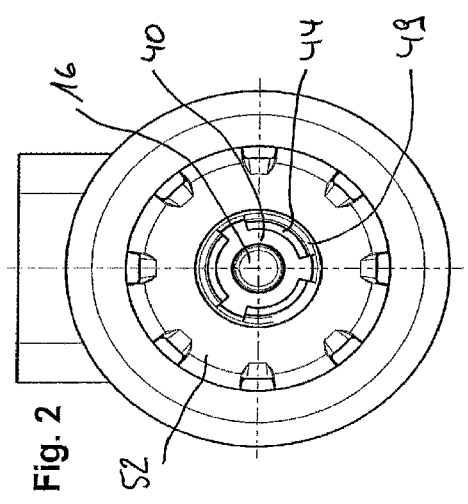
FIG. 2: an end view of the embodiment as in FIG. 1.

Thus the first embodiment of FIGS. 1, 2 shows a plastic stop element 40 as a means for limiting the stroke, which is constructed as an injection moulding and held against a first annular shoulder 42 in the interior of the housing 10 (the armature unit is guided in the housing 10 in other respects as described in connection with FIG. 6). The plastic stop element 40 cooperates with a disc 44 (in the present example made as a sintered element or stamping), ring seals 46 (outer seal) or 48 (inner seal) being inserted and clamped between element 40 and 44 both in the region of the outer edge to the inner wall of the housing, and in the region of the inner edge in a direction towards the plunger 16 (alternatively these seals can also be constructed by e.g. sealing materials which can be placed on top or inserted by injection moulding).

The combination of disc 44 and stop element 40 (as can be seen in particular from the end view of FIG. 2, a section of the plastic element 40 extends through the disc) abuts against a bead 48 which marks the end of the housing 10; in addition the disc 44 abuts against a second inner annular shoulder 50. Due to the arrangement shown in this way, construction of the (right) armature stop is therefore possible in a particularly elegant and simple manner with respect to manufacture, and in addition receipt and guiding of the grooved plunger 16, the arrangement shown combining a capacity for easy manufacture and assembly with optimum sealing.

Figure 3:
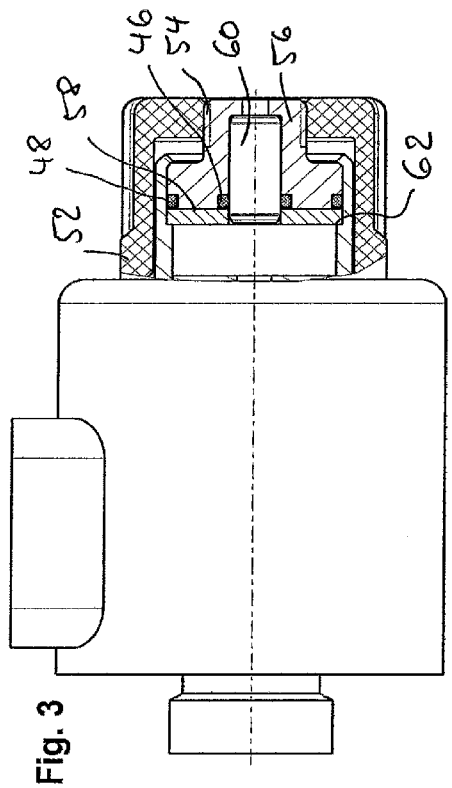
FIG. 3: a part-sectional view similar to FIG. 1 to illustrate a second embodiment of the present invention.
Figure 4:
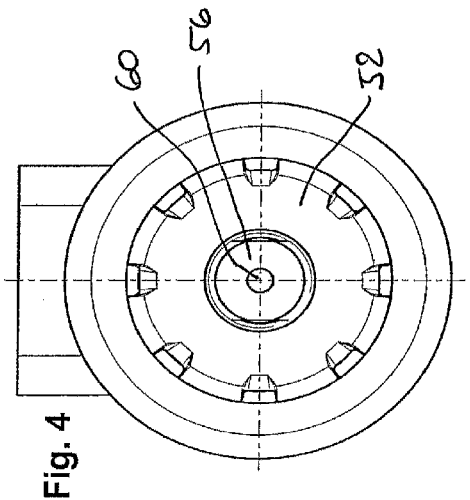
FIG. 4: an end view of the embodiment as in FIG. 3.

FIGS. 3 and 4 show a second embodiment as a variant of the first embodiment shown in FIGS. 1 and 2; in the same way as there, a sleeve nut 52 is seated on an external thread 54 formed by the outer peripheral end of the element 40 protruding through the housing end.

Unlike the embodiment of FIG. 1, a stop element 56 as a plastic injection moulding is seated in the terminal region, directly adjacent to a (stamped) disc 58 mounted in front in a direction towards the armature; again, inner and outer ring seals 46, 48 are provided for sealing off from the inner housing or from a plunger 60 (which is purely cylindrical here). Again unlike the embodiment as in FIG. 1, only one annular shoulder 62 is formed in the interior of the housing.

The part-sectional view of FIG. 5 illustrates a further variant of the stop element; in the embodiment shown there, the stop is constructed by a pair of stamped or sintered discs 64, 66 which in the embodiment shown are of identical construction (advantageously for serial manufacture). An annular shoulder of the elements 64 and 66 on both sides in cross-section serves to receive inner or outer ring seals 46, 48, or to cooperate with a terminal shoulder of a plunger 68 (protruding terminally here). This arrangement is also held terminally in the housing between a single annular shoulder 62 and a terminal bead 70.

The embodiment of FIG. 7 brings a further modification of mounting of the sleeve nut 52 shown in FIG. 1 or in FIG. 3 (so that the embodiment in FIG. 7 basically could be combined with any other embodiments of the present invention). Here, the function of the sleeve nut is taken over by a yoke disc 72 which is provided with a suitable internal thread and seated on an external thread 74 of the housing 10 and forms part of the magnetic circuit.

FIG. 8 illustrates an alternative design of the plunger, where a plunger 76 manufactured as a deep-drawn part forms a sleeve-like section 78 which forms a peripheral annular collar 80, as a result of which the plunger assembly is held in the interior region of the stop body 20 (the technology provided as the state of the art is shown here; basically, however, the configuration of the plunger 76 with any other variant of the stop element according to the present application is possible and conceivable). Not only is the plunger easier and cheaper to manufacture and assemble by this procedure, but also the collar 18 produces a distance from the element 20.

Figure 10:
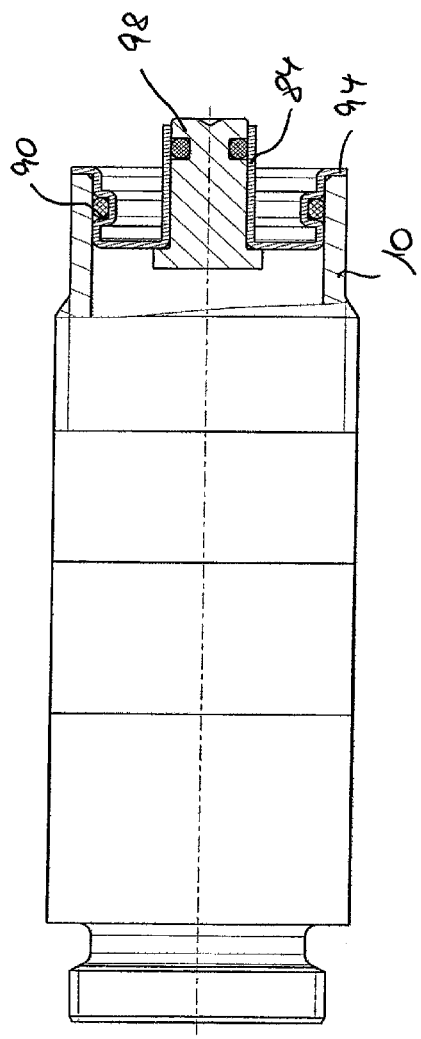
FIG. 10: a part-sectional view of a seventh embodiment of the present invention, for which protection is requested in connection with all the other embodiments, but also independently.

FIGS. 9 and 10 show, according to further embodiments, variants in design of the stop element. Here, the latter is constructed as a one-piece deep-drawn part 82 (FIG. 9) or 84 (FIG. 10), has suitable (e.g. annular groove-like or annular shoulder-like) shaped portions 86, 88 or 90 for receiving seals relative to the inner surface of the housing or the plunger, and is connected to the housing either by means of a resiliently bent-up latch section 92 (FIG. 9), or alternatively by means of a weld flange 94 which is annularly angled (FIG. 10). In the former case a releasable snap-fit device would thus be formed, and in the latter case the unit 84 would be non-releasably connected to the open end of the housing by gluing or welding. In both cases, as can be seen from the figures, reliable guiding of the respective plungers 96 or 98 is achieved.

Figure 12:
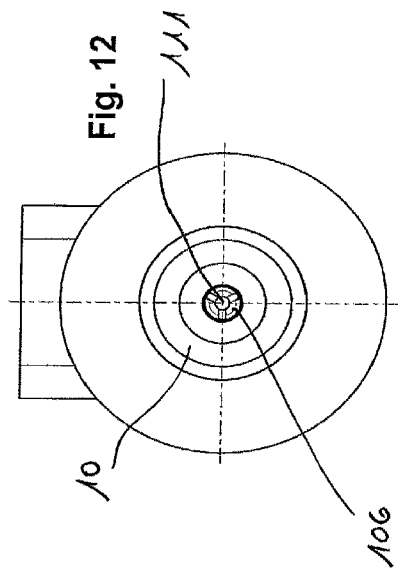
FIG. 12: an end view of the embodiment as in FIG. 11.
Figure 11:
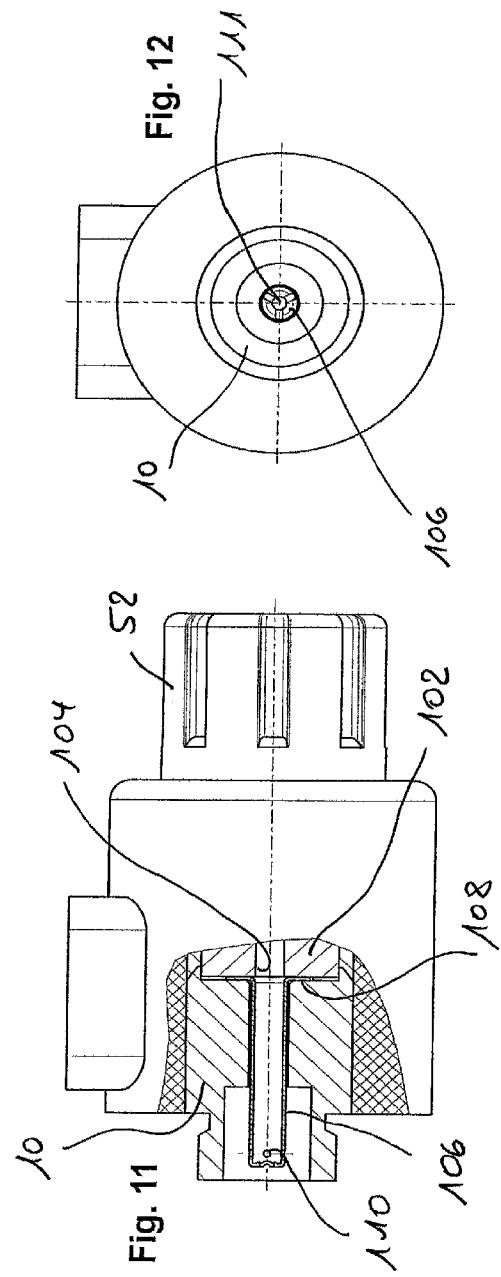
FIG. 11: a part-sectional view according to an eighth embodiment of the present invention, for which protection is requested in connection with all the other embodiments, but also independently.

FIGS. 11 and 12 illustrate a further embodiment of the present invention which designs the armature plunger unit seated on an armature block 102 (corresponding to element 32 in FIG. 6, but with centre bore 104) as a sleeve (made by deep drawing), such that the open end of the sleeve widens in a direction towards the armature block like an annular collar into a ring flange 108 which is seated on the inner side of the housing 10; consequently the flange thus forms a distance piece from the armature block 102 which can effectively prevent sticking, by magnetic action. At the same time in this way a flow channel (for fluid or oil pressure equalisation in the system) is opened centrally towards the centre bore 104, so that up to the front engaging end of the plunger element 106 (suitable shaped portions or openings 110 for oil escape are formed there) there is a through-connection; unlike the procedure of FIG. 6, here it is no longer necessary for fluid equalisation to take place laterally of the plunger, but instead it takes place through its centre.

What is claimed is:

1. Electromagnetic actuator device having:
   an armature unit which is axially guided in a housing (10) and movable by passing current through a coil device and in particular against a return force of a return spring out of a first stop position defined by means for limiting the stroke,
   characterised in that:
   the means for limiting the stroke have a stop element (40; 56; 64; 66) which is made of a non-magnetic material and is mounted terminally in the housing and which is designed to cooperate with a plunger unit (16; 60; 68) which can be actuated outside the housing and is designed for mechanically moving the armature out of the first stop position;
   the plunger unit and/or the stop element is constructed as a deep-drawn part;
   the armature unit is designed to cooperate with a distance piece (108) located intermediate of the second stop position opposite a direction of the first stop position, the distance piece being constructed in one piece with a plunger section (106) on the engaging side of the armature unit; and
   a lubricant equalising channel is formed by the sleeve section and the cylindrical armature body, in particular by a central bore (104) in the armature body which is aligned with the sleeve section.

2. Device according to claim 1, characterised in that the stop element is made of a non-magnetic plastic material.

3. Device according to claim 1, characterised in that the stop element is designed to cooperate with a disc element (44; 58) in such a way that a seal (48; 50) acting against an inner wall of the housing and/or against the plunger unit is held between stop element and disc element, the seal being a separate element or integrally moulded on the stop element and/or disc element.

4. Device according to claim 3, characterised in that the disc element is sintered part.

5. Device according to claim 3, characterised in that the disc element is a stamped part.

6. Device according to claim 3, characterised in that the disc element is an injection-molded part.

7. Device according to claim 1, characterised in that the stop element protrudes terminally from the housing and there forms a threaded section (54) which is designed in particular to cooperate with a screw nut securing the housing to a point of application, in particular a sleeve nut (52).

8. Device according to claim 1, characterised in that the plunger section is elongate and designed terminally to cooperate with an actuating partner, in particular a valve, preferably hydraulic or pneumatic valve.

9. Device according to claim 1, characterised in that the plunger section is designed as a deep-drawn part, in particular made of a non-magnetic metal material, having a sleeve section and a planar collar section as a distance piece abutting at the face against a preferably cylindrical armature body of the armature unit.

10. Electromagnetic actuator device having:
    an armature unit which is axially guided in a housing (10) and movable by passing current through a coil device and in particular against a return force of a return spring out of a first stop position defined by means for limiting the stroke,
    characterised in that:
    the means for limiting the stroke have a stop element (40; 56; 64; 66) which is made of a non-magnetic material and is mounted terminally in the housing and which is designed to cooperate with a plunger unit (16; 60; 68) which can be actuated outside the housing and is designed for mechanically moving the armature out of the first stop position;
    the plunger unit and/or the stop element is constructed as a deep-drawn part; and
    an end section of the stop element (82) constructed as a deep-drawn part—which end section is directed towards the end of the housing—has a snap section (92) which acts against a support, in particular a projection and/or an annular groove of the housing.

11. Electromagnetic actuator device having:
    an armature unit which is axially guided in a housing (10) and movable by passing current through a coil device and in particular against a return force of a return spring out of a first stop position defined by means for limiting the stroke,
    characterised in that:
    the means for limiting the stroke have a stop element (40; 56; 64; 66) which is made of a non-magnetic material and is mounted terminally in the housing and which is designed to cooperate with a plunger unit (16; 60; 68) which can be actuated outside the housing and is designed for mechanically moving the armature out of the first stop position;
    the plunger unit and/or the stop element is constructed as a deep-drawn part; and
    the stop element (84) designed as a deep-drawn part has, terminally, a connecting section (94) designed for non-releasable connection, in particular welding, to the end of the housing, preferably constructed like a collar.

12. Electromagnetic actuator device having:
    an armature unit which is axially guided in a housing (10) and movable by passing current through a coil device and in particular against a return force of a return spring out of a first stop position defined by means for limiting the stroke,
    characterised in that:
    the means for limiting the stroke have a stop element (40; 56; 64; 66) which is made of a non-magnetic material and is mounted terminally in the housing and which is designed to cooperate with a plunger unit (16; 60; 68) which can be actuated outside the housing and is designed for mechanically moving the armature out of the first stop position;

the plunger unit and/or the stop element is constructed as a deep-drawn part; and the stop element constructed as a deep-drawn part provides a receiving groove (86, 90), in particular an annular groove, for a seal, in particular a ring seal, acting against an inner wall of the housing and/or the plunger unit.

13. An electromagnetic actuator device comprising:

a body (11) containing a coil device (13);

an armature housing (10);

an armature unit which is axially guided in the housing (10) and movable by passing current through a coil device;

a plunger unit (16; 60; 68) which can be actuated from outside the housing and for mechanically moving the armature out of a first stop position;

means for limiting a stroke of the armature unit comprising:

a stop element (40; 56; 64; 66) which is made of a non-magnetic material and mounted in the housing and cooperates with the plunger;

a disc element (44; 58); and a seal (48; 50), wherein:

the stop element cooperates with the disc element (44; 58);

the seal (48; 50) acts against an inner wall of the housing and/or against the plunger unit; and the seal is unitarily moulded with the stop element and/or disc element by injection moulding.

14. The device of claim 13 wherein:

the stop element non-magnetic material is a moulding.

15. Electromagnetic actuator device having:

an armature unit which is axially guided in a housing (10) and movable by passing current through a coil device and in particular against a return force of a return spring out of a first stop position defined by means for limiting the stroke, characterised in that:

the means for limiting the stroke have a stop element (40; 56; 64; 66) which is mounted terminally in the housing and manufactured by a shaping, stamping, sintering and/or injection moulding method, and which is designed to cooperate with a plunger unit (16; 60; 68) which can be actuated outside the housing and is designed for mechanically moving the armature out of the first stop position; and the housing has an external thread (74) which is designed to cooperate with a yoke disc (72) acting as part of the magnetic circuit of the electromagnetic actuator, the yoke disc being designed for additionally fixing the housing (10) to a point of application.

16. Electromagnetic actuator device having an armature unit which is axially guided in a housing (10) and movable by passing current through a coil device and in particular against a return force of a return spring out of a first stop position defined by means for limiting the stroke, characterised in that:

the means for limiting the stroke have a stop element (40; 56; 64; 66) which is made of a non-magnetic material and is mounted terminally in the housing and manufactured by a shaping, stamping, sintering and/or injection moulding method, and which is designed to cooperate with a plunger unit (16; 60; 68) which can be actuated outside the housing and is designed for mechanically moving the armature out of the first stop position;

the armature unit is designed to cooperate with a distance piece (108) located intermediate of the second stop position opposite a direction of the first stop position, the distance piece being constructed in one piece with a plunger section (106) on the engaging side of the armature unit; and a lubricant equalising channel which is formed by the sleeve section and the cylindrical armature body, in particular by a central bore (104) in the armature body is aligned with the sleeve section.

\* \* \* \* \*